(12) United States Patent
Whight et al.

(10) Patent No.: US 6,473,452 B2
(45) Date of Patent: Oct. 29, 2002

(54) METHOD AND APPARATUS FOR DIGITAL CORRELATION

(75) Inventors: Kenneth R. Whight, Horsham (GB); Christopher J. Goodings, Fleet (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 22 days.

(21) Appl. No.: 09/730,428

(22) Filed: Dec. 5, 2000

(65) Prior Publication Data

US 2001/0003821 A1 Jun. 14, 2001

(30) Foreign Application Priority Data

Dec. 11, 1999 (GB) ................................. 9929269

(51) Int. Cl.$^7$ ................................. H04B 1/69
(52) U.S. Cl. ................................. 375/142
(58) Field of Search ................................. 375/142, 130, 375/150, 143, 152, 347, 351, 343; 370/206, 208, 320, 335, 342, 441

(56) References Cited

U.S. PATENT DOCUMENTS

| | | | |
|---|---|---|---|
| 4,507,748 A | 3/1985 | Cotton | 364/749 |
| 4,593,378 A | 6/1986 | Mc Whirter et al. | 364/900 |
| 5,239,496 A | 8/1993 | Vancraeynest | 364/728.03 |
| 5,305,245 A | 4/1994 | Kurihara | 364/728.03 |
| 5,809,009 A | * 9/1998 | Matsuoka et al. | 370/206 |
| 5,946,359 A | * 8/1999 | Tajiri et al. | 375/331 |
| 6,249,608 B1 | * 6/2001 | Ikeda et al. | 382/209 |

* cited by examiner

Primary Examiner—Chi Pham
Assistant Examiner—Emmanuel Bayard

(57) ABSTRACT

A method of correlating first and second digital signals which both contain series of numerical data values is disclosed together with a computer program, a computer-readable storage medium) and apparatus for the same. The method includes the steps of (a) sequentially calculating products of corresponding numerical data values of the first and second digital signals and providing a cumulative sum thereof; (b) upon deviation of the cumulative sum from between upper and lower thresholds levels, increasing or decreasing the cumulative sum by a predetermined amount so as to return the cumulative sum to between said threshold levels; and (c) providing a correlation parameter as a function of the number of occurrences of deviation of the cumulative sum from between upper and lower thresholds. The correlation parameter may either increase or decrease depending on whether the cumulative sum deviates above the upper threshold level or below the lower threshold level.

23 Claims, 4 Drawing Sheets

METHOD AND APPARATUS FOR DIGITAL CORRELATION

BACKGROUND OF THE INVENTION

This invention relates to a method of digital correlation and to a computer program, a computer-readable storage medium and apparatus for the same The requirement to correlate two digital signals arises in many applications. For example, in a receiver for CDMA type communication including a global positioning system (GPS) receiver, it is necessary to correlate an incoming CDMA signal containing a pseudorandom noise code (PRN) with a locally generated replica PRN code in order to determine the code phase error between the two, and thereafter acquire and track the CDMA signal.

Such signals may be represented in the form of 1, 1.5, 2 or more bits. The more bits used, however, the more complex is the circuitry or, if implemented by software, the greater the microprocessing power required to process the signals. Known methods of digital correlation are disclosed, inter alia, in U.S Pat. Nos. 4,507,748, 4,593,378, 5,239,496 and 5,305,245.

SUMMARY OF THE INVENTION

It is an object of the present invention to provide an alternative, efficient method of digital correlation.

According to the present invention, there is provided a method of correlating first and second digital signals when both signals contain a series of numerical data values and apparatus having processing means for performing the same, the method comprising the steps of:

(a) sequentially calculating products of corresponding numerical data values of the first and second digital signals and providing a cumulative sum thereof;

(b) upon deviation of the cumulative sum from between upper and lower thresholds levels, increasing or decreasing the cumulative sum by a predetermined amount so as to return the cumulative sum to between said threshold levels; and (c) providing a correlation parameter as a function of the number of occurrences of deviation of the cumulative sum from between upper and lower thresholds.

Such a method provides an alternative, efficient method of digital correlation.

In a preferred method, the correlation parameter either increases or decreases depending on whether the cumulative sum deviates above the upper threshold level or below the lower threshold level.

In such a method, the correlation parameter is conveniently provided as a counter wherein the counter increases by one when the cumulative sum deviates above the upper threshold level; and wherein the counter decreases by one when the cumulative sum deviates below the lower threshold level.

Where the cumulative sum is stored in a register, wherein step (b) may be accomplished by allowing the register to either underflow or overflow. This can be provided using a simplified processing architecture.

The first signal may be a lower bit representation of a third digital signal or alternatively, a low bit representation of an analogue signal, further simplifying processing.

Also provided in accordance with the present invention is a GPS receiver comprising receiver means for receiving a subject signal containing a target pseudorandom noise code; and processing means for generating early and late replica code signals corresponding to the target code, correlating the subject signal with the early and late replica code signals and returning respective early and late correlation values, and calculating a code phase discriminator for determining whether the target code has been acquired; wherein the correlation between the subject signal and the early and late replica code signals is performed by steps:

(a) sequentially calculating products of corresponding numerical data values of the subject signal and early and late signals and providing a cumulative sum thereof;

(b) upon deviation of the cumulative sum from between upper and lower thresholds levels, increasing or decreasing the cumulative sum by a predetermined amount so as to return the cumulative sum to between said threshold levels; and (c) providing early and late correlation values as a function of the number of occurrences of deviation of the cumulative sum from between upper and lower thresholds.

Where the subject signal is received as a carrier wave signal modulated by the target code, the method may further comprise the step of providing in phase (I) and quadrature phase (Q) components of subject signal; wherein, the I and Q components are each correlated with the early (E) and late (L) replica code signals to provide respective $I_E$, $I_L$, $Q_E$ and $Q_L$ correlation values; and wherein the code phase discriminator is calculated as a function of $I_E$, $I_L$, $Q_E$ and $Q_L$.

This provides enhanced code phase correlation in circumstances where there is no precise carrier phase lock.

Ideally, the early and late correlation values either increase or decrease depending on whether the cumulative sum deviates above the upper threshold level or below the lower threshold level. In such circumstances, the early and late correlation values may be counters wherein the counters increase by one when the cumulative sum deviates above the upper threshold level and decrease by one when the cumulative sum deviates below the lower threshold level.

Where the cumulative sum is stored in a register, wherein step (b) may be accomplished by allowing the register to either underflow or overflow.

BRIEF DESCRIPTION OF THE DRAWINGS

Embodiments of the present invention will now be described, by way of example only, with reference to the accompanying figures in which.

DESCRIPTION OF THE PREFERRED EMBODIMENTS

Figure 1A:
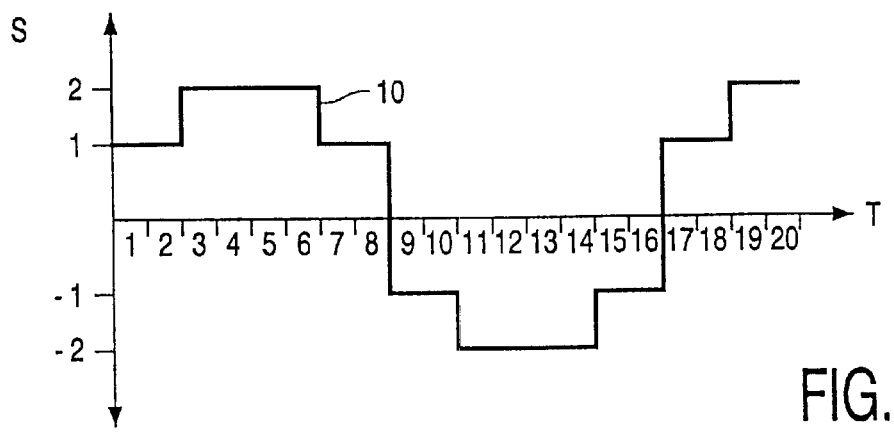
FIGS. 1A to 1E illustrate a method in accordance with the present invention.
Figure 1B:
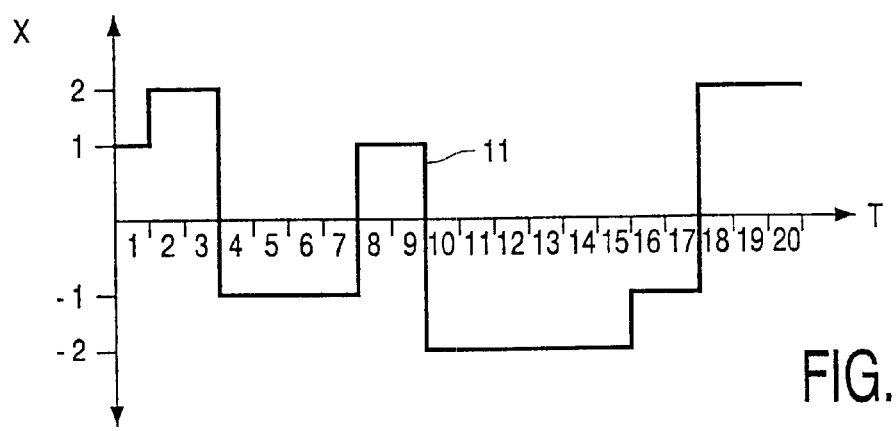

Referring to FIGS. 1A to AE, the method of correlation is illustrated with reference to two signals, both representative of a series of numeric data consisting of 20×2.5 bit data units. A first reference signal corresponding to a sampled sine wave is provided as described by curve 10 of FIG. 1A. This is correlated with a second signal as described by curve 11 of FIG. 1B. Both signals have maxima and minima of two and minus two respectively.

Figure 1C:
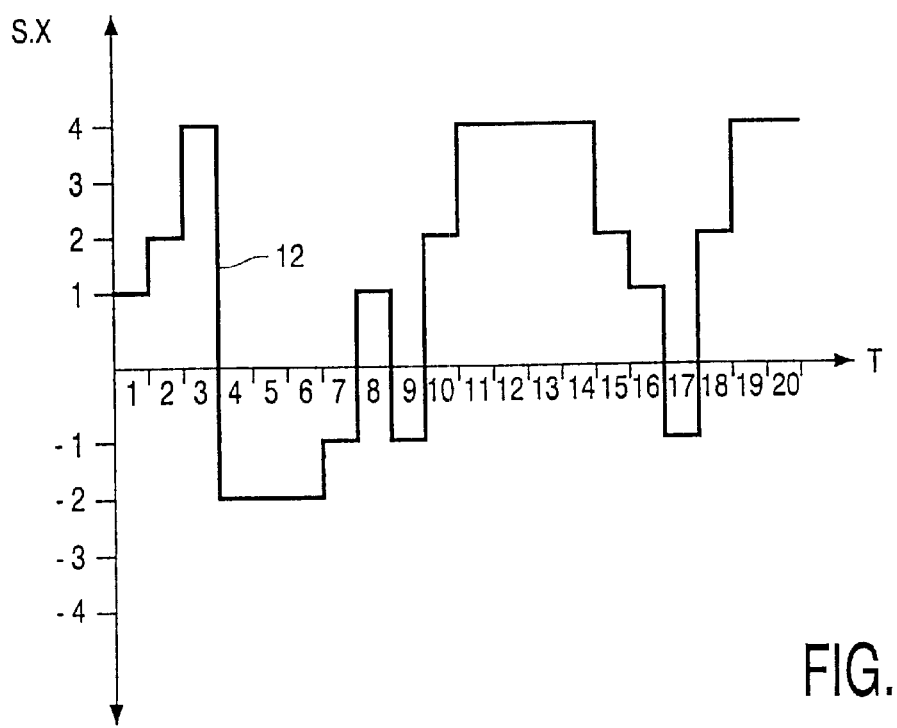

According to the method, corresponding numerical data values of the first and second digital signals are multiplied, the results of which are shown in FIG. 1C. The theoretical maxima and minima for first and second signals having the same bit representation as above is four and minus four respectively, though for the first and second signals of FIGS. 1A and 1B, the maxima and minima is four and minus two, indicative of some degree of correlation.

Figure 1D:
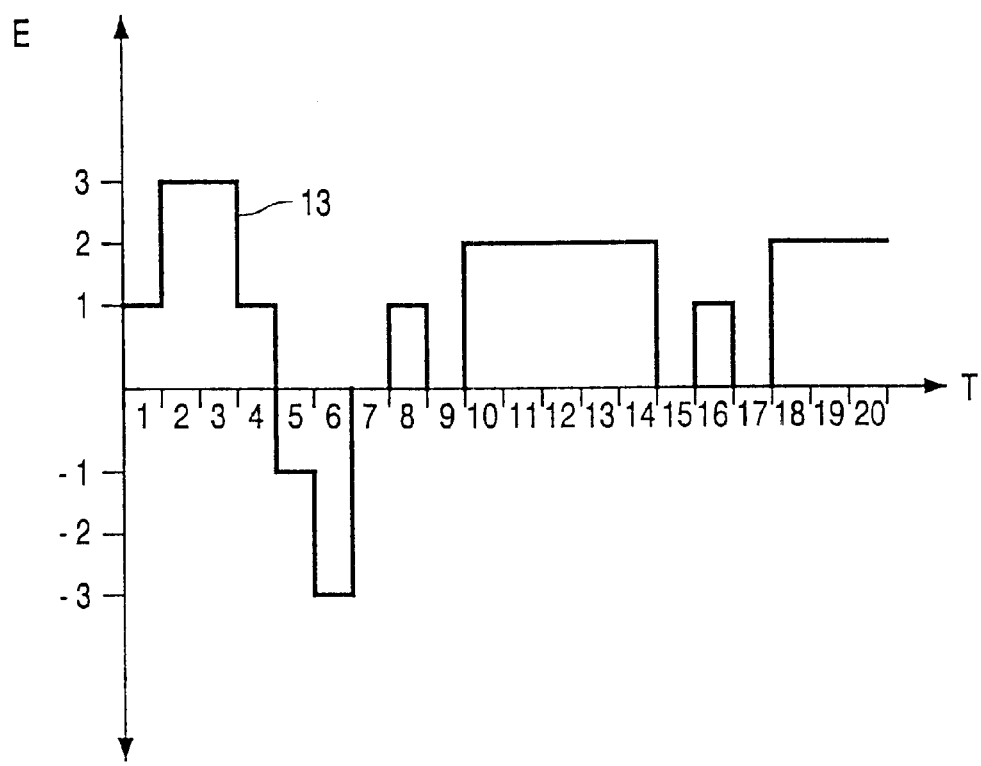

As described by curve 13 of FIG. 1D, a modified cumulative sum of the products is provided whereby if the cumulative sum were to exceed four or be less than minus four, it is reduced by four or increased by four respectively.

Figure 1E:
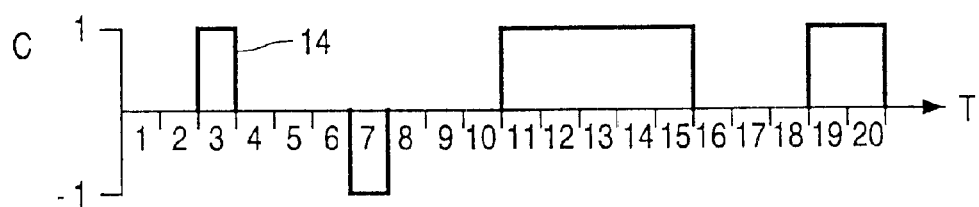

A logic return is provided as shown in FIG. 1E, whereby if the cumulative sum is reduced by four, a one is returned, if the cumulative sum is increased by four, a minus one is returned, and if the cumulative sum is not modified, a zero is returned. A correlation parameter is then provided as a sum of the logic returns which using the signals illustrated in FIGS. 1A and 1B would be equal to seven.

The discrete values for each signal and stage of calculation are shown in table 1 below. (*) denotes where the cumulative sum is modified to return the sum to between the upper and low thresholds of four and -four respectively.

TABLE 1

Parameter values over time intervals 1 to 20

| Time Interval | Sine Wave (S) | Signal (X) | Product (S · X) | Cumulative Sum (Σ) | Modified Σ (Σ*) | Logic Output |
|---|---|---|---|---|---|---|
| 1 | 1 | 1 | 1 | 1 | 1 | 0 |
| 2 | 1 | 2 | 2 | 3 | 3 | 0 |
| 3 | 2 | 2 | 4 | 7 | 3* | 1 |
| 4 | 2 | -1 | -2 | 5 | 1 | 0 |
| 5 | 2 | -1 | -2 | 3 | -1 | 0 |
| 6 | 2 | -1 | -2 | 1 | -3 | 0 |
| 7 | 1 | -1 | -1 | 0 | 0* | -1 |
| 8 | 1 | 1 | 1 | 1 | 1 | 0 |
| 9 | -1 | 1 | -1 | 0 | 0 | 0 |
| 10 | -1 | -2 | 2 | 2 | 2 | 0 |
| 11 | -2 | -2 | 4 | 6 | 2* | 1 |
| 12 | -2 | -2 | 4 | 10 | 2* | 1 |
| 13 | -2 | -2 | 4 | 14 | 2* | 1 |
| 14 | -2 | -2 | 4 | 18 | 2* | 1 |
| 15 | -1 | -2 | 2 | 20 | 0* | 1 |
| 16 | -1 | -1 | 1 | 21 | 1 | 0 |
| 17 | 1 | -1 | -1 | 20 | 0 | 0 |
| 18 | 1 | 2 | 2 | 22 | 2 | 0 |
| 19 | 2 | 2 | 4 | 26 | 2* | 1 |
| 20 | 2 | 2 | 4 | 30 | 2* | 1 |

Total 7

Thus, in the example given, for a 2.5 bit representation of a sine wave and signal representation wherein the maximum and minimum of the product and the upper and lower cumulative sum thresholds are 4 and minus 4 respectively, the sum of the logic outputs is 7. This corresponds to a true multi-but sum of 7.5 being equal to the unmodified cumulative sum total (30) divided by the threshold (four).

Figure 2:
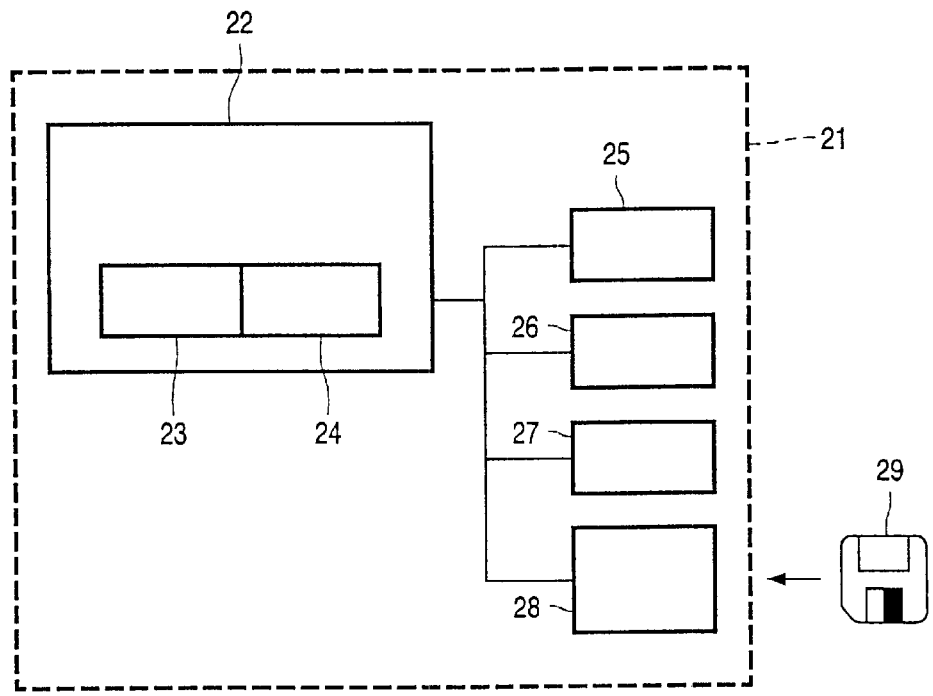
FIG. 2 shows, schematically, a computer system capable of implementing the method illustrated in FIGS. 1A to 1E.

A computer system 21 capable of implementing the above method is shown schematically in FIG. 2. The computer system comprises a processor 22 having a central processing unit (CPU) 23 and a random access memory (RAM) 24. The computer system further comprises a display 25, keyboard 26, mouse 27 and a floppy disk drive 28, all coupled to the processor in known manner. A floppy disk 29 is provided for the floppy disk drive having stored therein a computer program comprising instructions for performing a method according to the present invention. Alternatively, other types of computer-readable storage media and corresponding hardware may be used such as a ROM in an electronic device.

Implementation of a method according to the present invention in such a computer system 21 may be readily accomplished in hardware, in software by appropriate computer programming and configuration or through a combination of both. Of course, such programming and configuration is well known and would be accomplished by one of ordinary skill in the art without undue burden.

As previously stated, the requirement to correlate two digital signals arises in GPS receivers wherein an incoming GPS signal containing a pseudorandom noise code (PRN) is correlated with a locally generated replica PRN code in order to determine the code phase error between the two, and thereafter acquire and track the GPS signal. The general principles underlying GPS and methods and apparatus for its implementation are known. For example, see GPS Principles and Applications (Editor, Kaplan) ISBN 0-89006-793-7 Artech House, hereinafter "Kaplan".

As is well known, each NAVSTAR GPS satellite transmits two carrier frequencies; L1, the primary frequency at 1575.42 MHz and L2, the secondary frequency at 1227.60 MHz. The carrier frequencies are modulated by spread spectrum codes with a PRN sequence unique to each satellite and also by the navigation data message. The L1 signal is modulated by both the course/acquisition (C/A) code and the precision (P[Y]) code whereas the L2 signal is modulated by the P[Y] code only. The P[Y] codes relate to the precise positioning service (PPS) primarily for military and select government agency users whereas the C/A relates to the standard positioning service (SPS) for which there is currently unrestricted access.

Figure 3:
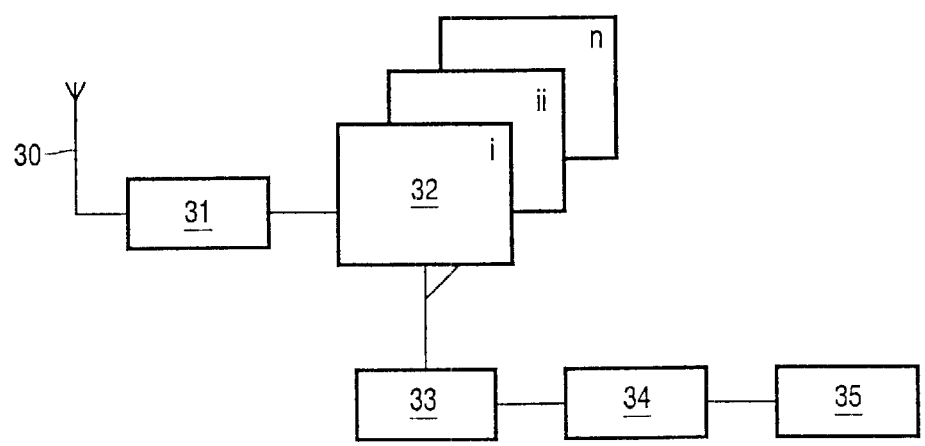
FIG. 3 shows, schematically, a GPS receiver using a method according to the present invention.
Figure 4:
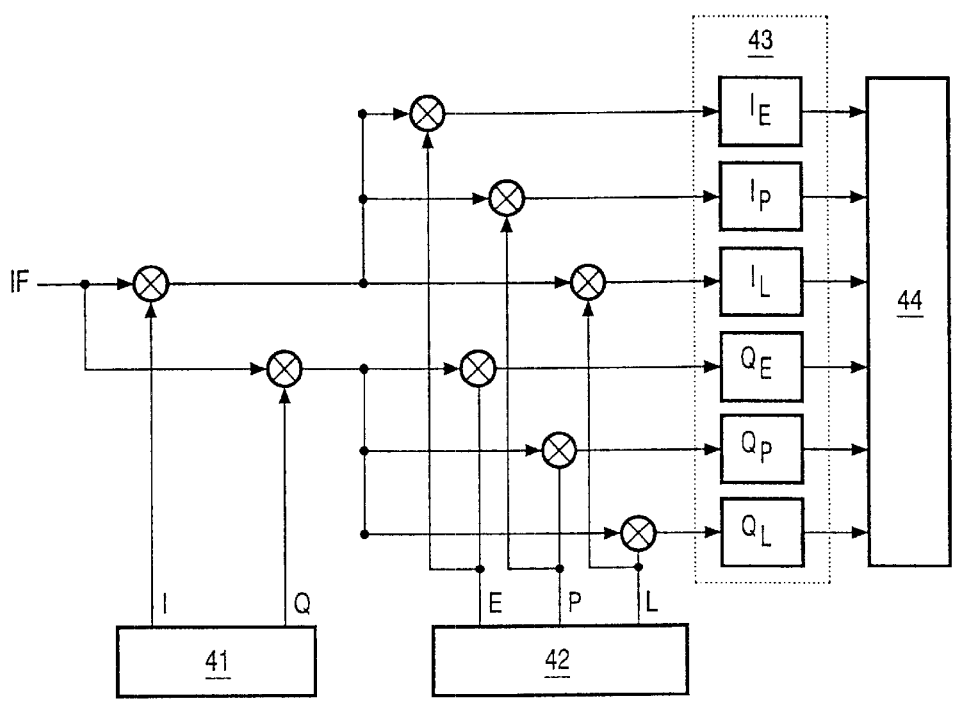
FIG. 4 shows, schematically, the receiver channels and receiver processor of the GPS receiver of FIG. 3 in greater detail.

FIG. 3 shows, schematically, a GPS receiver using a method according to the present invention. SPS GPS signals are received by an antenna 30 and pre-processed in a pre-processor 31; typically by passive bandpass filtering in order to minimise out-of-band RF interference, preamplification, down converting to an intermediate frequency (IF) and analog to digital conversion. The resultant, digitised IF signal remains modulated, still containing all the information from the available satellites, and is fed into each of twelve parallel receiver channels 32 (one such channel is shown in FIG. 4). The satellite signals are acquired and tracked in respective digital receiver channels in co-operation with the receiver processor 33 for the purpose of acquiring navigation information. Such methods for acquisition and tracking are well known, for example, see chapter 4 (GPS satellite signal characteristics) & chapter 5 (GPS satellite signal acquisition and tracking), Kaplan ibid.

Using acquired navigation information and the time of arrival of the transmissions, the navigation processor 34 calculates the position of the receiver using conventional algorithms and that position is displayed on a display 35 to the user.

The pre-processor 31 will be typically implemented in the form of front end analogue circuitry with the digital receiver channels 32, the receiver processor 33 and the navigation processor 34 implemented in the form of a general purpose microprocessor or a microprocessor embedded in a GPS application specific integrated circuit (ASIC).

FIG. 4 shows, schematically, the receiver channel co-operating with the receiver processor in greater detail. In order to retrieve the information on the incoming signal, a carrier wave (CW) must be removed and this is done by the receiver generating in-phase (I) and quadrature phase (Q) replica carrier wave signals using a carrier wave generator 41. The replica carrier waves ideally have the same frequency as the received signal, however, due to Doppler shift caused by the relative movement between the receiver and orbiting satellites, the frequency of the GPS signals as received in the receiver normally differs from the precise satellite transmission frequency. In order to accurately replicate the frequency of the received carrier wave, a conventional carrier wave phase lock loop (PLL) may be employed. It is possible, though undesirable, to omit the carrier phase lock stage altogether as the Doppler shift of the carrier and its associated effect on the code phase discriminator are reasonably small.

In order to acquire code phase lock, early (E), prompt (P) and late (L) replica codes of the PRN sequences are continuously generated by a code generator 42 at a frequency related to the received carrier (i.e. plus Doppler). The replica codes are then correlated using the method according to the represent invention with the I and Q signals to produce three in-phase correlation components ($I_E$, $I_L$, $I_P$) and three quadrature phase correlation components ($Q_E$, $Q_L$, $Q_P$), typically by integration in an integrator 43 over substantially the whole of the PRN code.

The method of correlation comprises the steps of firstly, sequentially calculating products of corresponding numerical data values of the subject signal and early and late signals and providing a cumulative sum thereof. Then, upon deviation of the cumulative sum from between upper and lower thresholds levels, increasing or decreasing the cumulative sum by a predetermined amount so as to return the cumulative sum to between said threshold levels. Finally, early and late correlation values are provided as counters of the number of occurrences of deviation of the cumulative sum from between upper and lower thresholds whereby the counters increase by one when the cumulative sum deviates above the upper threshold level, and decrease by one when the cumulative sum deviates below the lower threshold level.

In the receiver processor 44, a code phase discriminator is calculated according to equation 1:

$$CPD \Sigma (I_E + Q_E)^2 - \Sigma (I_L + Q_L)^2 \quad \text{[Equation 1]}$$

wherein summation occurs over substantially the whole of the target code. A threshold test is then applied to the code phase discriminator whereby a phase match is declared if the code phase discriminator is high. If not, the code generator produces the next series of replicas with single chip phase advance and the code phase discriminator is recalculated. Any declared phase match is validated by recalculating the discriminator. A linear phase sweep will eventually result in the incoming PRN code being in phase with that of the locally generated replica and thus code acquisition.

It would further understood by one of ordinary skill in the art that the teaching of the present invention applies equally to other types of apparatus comprising processing means and not only to the aforementioned computer system or GPS receiver. For example, one may implement the present invention using digital logic circuitry in a discrete correlator device.

What is claimed is:

1. A method of correlating first and second digital signals wherein both signals contain a series of numerical data values, the method comprising the steps of:

(a) sequentially calculating products of corresponding numerical data values of the first and second digital signals and providing a cumulative sum thereof;

(b) upon deviation of the cumulative sum from between upper and lower thresholds levels, increasing or decreasing the cumulative sum by a predetermined amount so as to return the cumulative sum to between said threshold levels; and (c) providing a correlation parameter as a function of the number of occurrences of deviation of the cumulative sum from between upper and lower thresholds.

2. A method according to claim 1 wherein the correlation parameter either increases or decreases depending on whether the cumulative sum deviates above the upper threshold level or below the lower threshold level.

3. A method according to claim 2 wherein the correlation parameter is a counter; wherein the counter increases by one when the cumulative sum deviates above the upper threshold level; and wherein the counter decreases by one when the cumulative sum deviates below the lower threshold level.

4. A method according to claim 1 wherein the cumulative sum is stored in a register; and wherein step (b) is accomplished by allowing the register to either underflow or overflow.

5. A method according to claim 1 wherein the first signal is a reduced bit representation of a third digital signal.

6. A method according to claim 1 wherein the first signal is a low bit representation of an analogue signal.

7. A computer-readable storage medium having stored therein a computer program for correlating first and second digital signals wherein both signals contain a series of numerical data values, the computer program, when executed, performs the steps comprising of:

(a) sequentially calculating products of corresponding numerical data values of the first and second digital signals and providing a cumulative sum thereof;

(b) upon deviation of the cumulative sum from between upper and lower thresholds levels, increasing or decreasing the cumulative sum by a predetermined amount so as to return the cumulative sum to between said threshold levels; and (c) providing a correlation parameter as a function of the number of occurrences of deviation of the cumulative sum from between upper and lower thresholds.

8. A computer-readable storage medium according to claim 7 wherein the correlation parameter either increases or decreases depending on whether the cumulative sum deviates above the upper threshold level or below the lower threshold level.

9. A computer-readable storage medium according to claim 8 wherein the correlation parameter is a counter; wherein the counter increases by one when the cumulative sum deviates above the upper threshold level; and wherein the counter decreases by one when the cumulative sum deviates below the lower threshold level.

10. A computer-readable storage medium according to claim 9 wherein the cumulative sum is stored in a register; and wherein step (b) is accomplished by allowing the register to either underflow or overflow.

11. A computer-readable storage medium according to claim 7 wherein the first signal is a reduced bit representation of a third digital signal.

12. A computer-readable storage medium according to claim 7 wherein the first signal is a low bit representation of an analogue signal.

13. An apparatus for correlating a first signal and a second signal, both the first and second signals contain a series of numerical data values, comprising:

a processor arranged to execute code to perform steps comprising of:

(a) sequentially calculating products of corresponding numerical data values of the first and second signals and providing a cumulative sum thereof;

(b) upon deviation of the cumulative sum from between upper and lower thresholds levels, increasing or decreasing the cumulative sum by a predetermined amount so as to return the cumulative sum to between said threshold levels; and (c) providing a correlation parameter as a function of the number of occurrences of deviation of the cumulative sum from between upper and lower thresholds.

14. A apparatus according to claim 13 wherein the correlation parameter either increases or decreases depending on whether the cumulative sum deviates above the upper threshold level or below the lower threshold level.

15. A apparatus according to claim 14 wherein the correlation parameter is a counter; wherein the counter increases by one when the cumulative sum deviates above the upper threshold level; and wherein the counter decreases by one when the cumulative sum deviates below the lower threshold level.

16. A apparatus according to claim 13 wherein the cumulative sum is stored in a register; and wherein step (b) is accomplished by allowing the register to either underflow or overflow.

17. A apparatus according to claim 13 wherein the first signal is a reduced bit representation of a third digital signal.

18. A apparatus according to claim wherein the first signal is a low bit representation of an analogue signal.

19. A GPS receiver comprising receiver means for receiving a subject signal containing a target pseudorandom noise code; and processing means for generating early and late replica code signals corresponding to the target code, correlating the subject signal with the early and late replica code signals and returning respective early and late correlation values, and calculating a code phase discriminator for determining whether the target code has been acquired; wherein the correlation between the subject signal and the early and late replica code signals is performed by steps:

(a) sequentially calculating products of corresponding numerical data values of the subject signal and early and late signals and providing a cumulative sum thereof;

(b) upon deviation of the cumulative sum from between upper and lower thresholds levels, increasing or decreasing the cumulative sum by a predetermined amount so as to return the cumulative sum to between said threshold levels; and (c) providing the early and late correlation values as a function of the number of occurrences of deviation of the cumulative sum from between upper and lower thresholds.

20. A GPS receiver according to claim 12 wherein in phase (I) and quadrature phase (Q) components of subject signal are provided wherein, the I and Q components are each correlated with the early (E) and late (L) replica code signals to provide respective $I_E$, $I_L$, $Q_E$ and $Q_L$ correlation values; and wherein the code phase discriminator is calculated as a function of $I_E$, $I_L$, $Q_E$ and $Q_L$.

21. A GPS receiver according to claim 19 wherein the early and late correlation values either increases or decreases depending on whether the cumulative sum deviates above the upper threshold level or below the lower threshold level.

22. A GPS receiver according to claim 21 wherein the early and late correlation values are counters which increase by one when the cumulative sum deviates above the upper threshold level, and decrease by one when the cumulative sum deviates below the lower threshold level.

23. A GPS receiver according to claim 19 wherein the cumulative sum is stored in a register; and wherein step (b) is accomplished by allowing the register to either underflow or overflow.

* * * * *